US008673226B2

(12) United States Patent
Schoof

(10) Patent No.: US 8,673,226 B2
(45) Date of Patent: Mar. 18, 2014

(54) APPARATUS AND METHOD FOR FORMING HYDRATED LIME

(75) Inventor: William H. Schoof, Seven Fields, PA (US)

(73) Assignee: Carmeuse Lime, Inc., Pittsburgh, PA (US)

( * ) Notice: Subject to any disclaimer, the term of this patent is extended or adjusted under 35 U.S.C. 154(b) by 220 days.

(21) Appl. No.: 13/102,117

(22) Filed: May 6, 2011

(65) Prior Publication Data

US 2012/0279425 A1 Nov. 8, 2012

(51) Int. Cl.
*C04B 2/08* (2006.01)
*B01J 19/18* (2006.01)
*B01J 19/00* (2006.01)
B01F 7/00 (2006.01)
B01D 53/50 (2006.01)

(52) U.S. Cl.
CPC ............... *C04B 2/08* (2013.01); *B01J 19/0066* (2013.01); *B01J 19/1856* (2013.01); *B01J 2219/182* (2013.01); *B01F 7/00975* (2013.01); *B01F 7/00891* (2013.01); *B01D 53/501* (2013.01)
USPC ........... 422/162; 422/225; 423/640; 366/292; 366/325.1; 366/325.92; 366/327.3; 366/327.4; 366/330.1

(58) Field of Classification Search
CPC ..... C04B 2/02; B01J 19/0066; B01J 19/1856; B01J 2219/00761; B01J 2219/182; B01F 7/00641; B01F 7/00975; B01F 7/00883; B01F 7/0043; B01F 7/045

USPC ........... 422/162, 224; 423/640; 366/299, 300, 366/301, 325.92, 327.1, 327.3, 327.4, 366/330.01
See application file for complete search history.

(56) References Cited

U.S. PATENT DOCUMENTS

| | | | |
|---|---|---|---|
| 2,904,401 A | 9/1959 | Booth | 23/188 |
| 3,150,926 A | 9/1964 | Pope | 23/66 |
| 3,625,273 A | 12/1971 | Buschor | 159/6 W |
| 4,154,798 A | 5/1979 | Bittner | 422/162 |
| 4,278,355 A * | 7/1981 | Forberg | 366/300 |
| 4,617,010 A | 10/1986 | Epper et al. | 494/52 |
| 4,741,896 A | 5/1988 | Thomas | 423/640 |
| 4,909,634 A | 3/1990 | Suzuki et al. | 366/307 |

FOREIGN PATENT DOCUMENTS

JP 2000204164 A * 7/2000

OTHER PUBLICATIONS

Machine Translation of JP 2000-204164 A (Jul. 2000).*

* cited by examiner

*Primary Examiner* — Lessanework Seifu
(74) *Attorney, Agent, or Firm* — Kratz, Quintos & Hanson, LLP

(57) ABSTRACT

An apparatus and method for hydrating lime in a horizontally disposed vessel where adjacent oppositely rotating shafts have first sets of spaced blades extending coaxially with an axis of each shaft and an adjacent second set of blades extending to an angle to the longitudinal axis, the blades directing a mixture of quicklime and water upwardly into a space between the shafts and towards the cover, while forming hydrated lime.

9 Claims, 5 Drawing Sheets

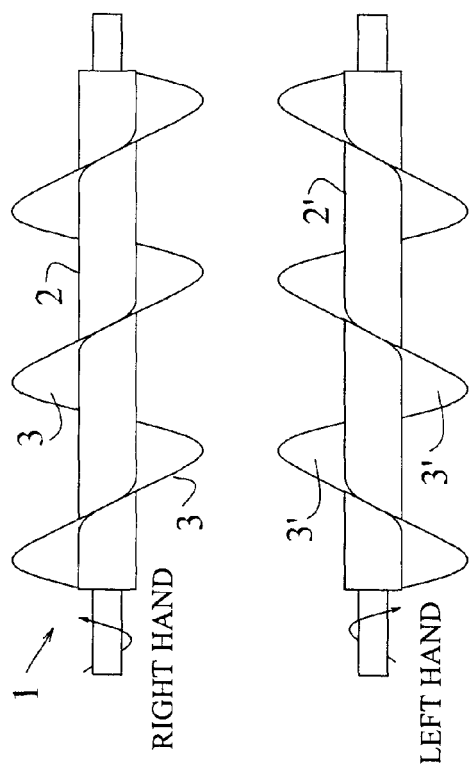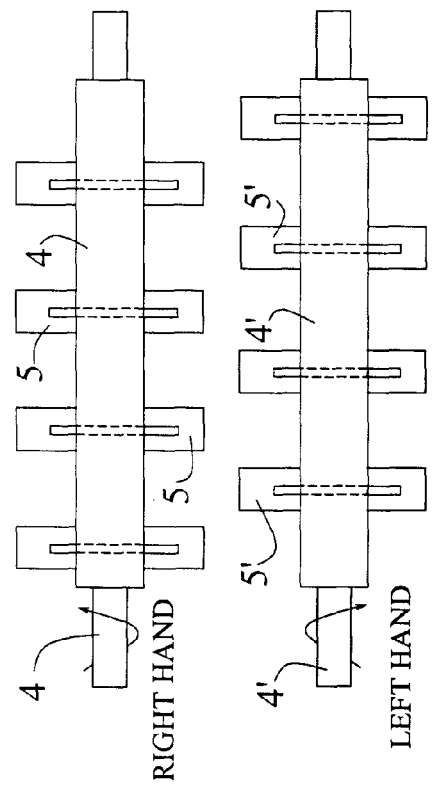
PRIOR ART
FIG. 2
PRIOR ART
FIG. 3

APPARATUS AND METHOD FOR FORMING HYDRATED LIME

BACKGROUND OF THE INVENTION

The formation of hydrated lime (Ca(OH)$_2$) is effected by mixing quicklime (CaO) with water, and is an exothermic reaction difficult to control.

Hydrated lime that is used in removal systems to remove sulfur dioxide from gaseous streams are usually required to have a low free moisture content (<2.0%) and BET specific surface areas of about 16-18 m$^2$/g or more, as well as pore volumes in the range of about 0.65-0.80 cm$^3$/g. It has been difficult, previously, to slake lime using conventional slakers to provide consistent results in slaked lime formation that had consistent high specific surface areas and pore volumes.

Some conventional systems for slaking lime to form hydrated lime (FIG. 2) have provided a closed horizontally disposed chamber using one or more Archimedes screw devices (1,2) to move the quicklime and water through the vessel while mixing the same, as schematically illustrated, while other conventional systems (FIG. 3) used spaced shafts with outwardly extending paddles attached thereto, which would mix and move the quicklime and water mixture from an inlet to an outlet of a closed vessel. Such conventional systems, however, have been found to not produce a product with sufficiently consistent properties such as specific surface areas and pore volume from one batch to another.

The need exists for an apparatus and method that will provide a consistent hydrated lime that has a specified specific high surface area and a high pore volume, which product would be useful in removing sulfur dioxide from gases, such as those gases produced in fossil fuel burning power plant systems.

SUMMARY OF THE INVENTION

A lime hydrating apparatus and method for producing a hydrated lime, within predetermined values of specific surface area and pore volume, uses an elongated, horizontally disposed, enclosed mixing vessel having a cover, an inlet at one end for feeding quicklime and water thereto to form a mixture, and a discharge at the other end for removal of hydrated lime therefrom. A pair of spaced, adjacent, parallel, rotatable shafts are disposed in the mixing vessel along a longitudinal axis of the mixing vessel, with the shafts being rotatable in opposite directions. Each shaft has a plurality of outwardly extending blades, with a plurality of first sets of blades extending in a coaxial direction with a longitudinal axis of the shaft and a plurality of second sets extending at an angle to the longitudinal axis. The blades are arranged such that mixture moving through the vessel is directed upwardly into a space between the shafts and towards the vessel cover while forming hydrated lime of specified properties, which hydrated lime is removed from the discharge of the vessel for use or storage.

BRIEF DESCRIPTION OF THE DRAWINGS

The invention will become more fully understood by reference to the attached drawings which illustrate a preferred embodiment thereof, and wherein:

FIG. 2 illustrates a conventional use of adjacent rotating shafts with spiral extensions for moving and mixing quicklime and water to forming hydrated lime in a vessel;

FIG. 3 illustrates another conventional use of adjacent rotating shafts with outwardly extending paddles for mixing quicklime and water and forming hydrated lime in a vessel;

DETAILED DESCRIPTION

Figure 1:
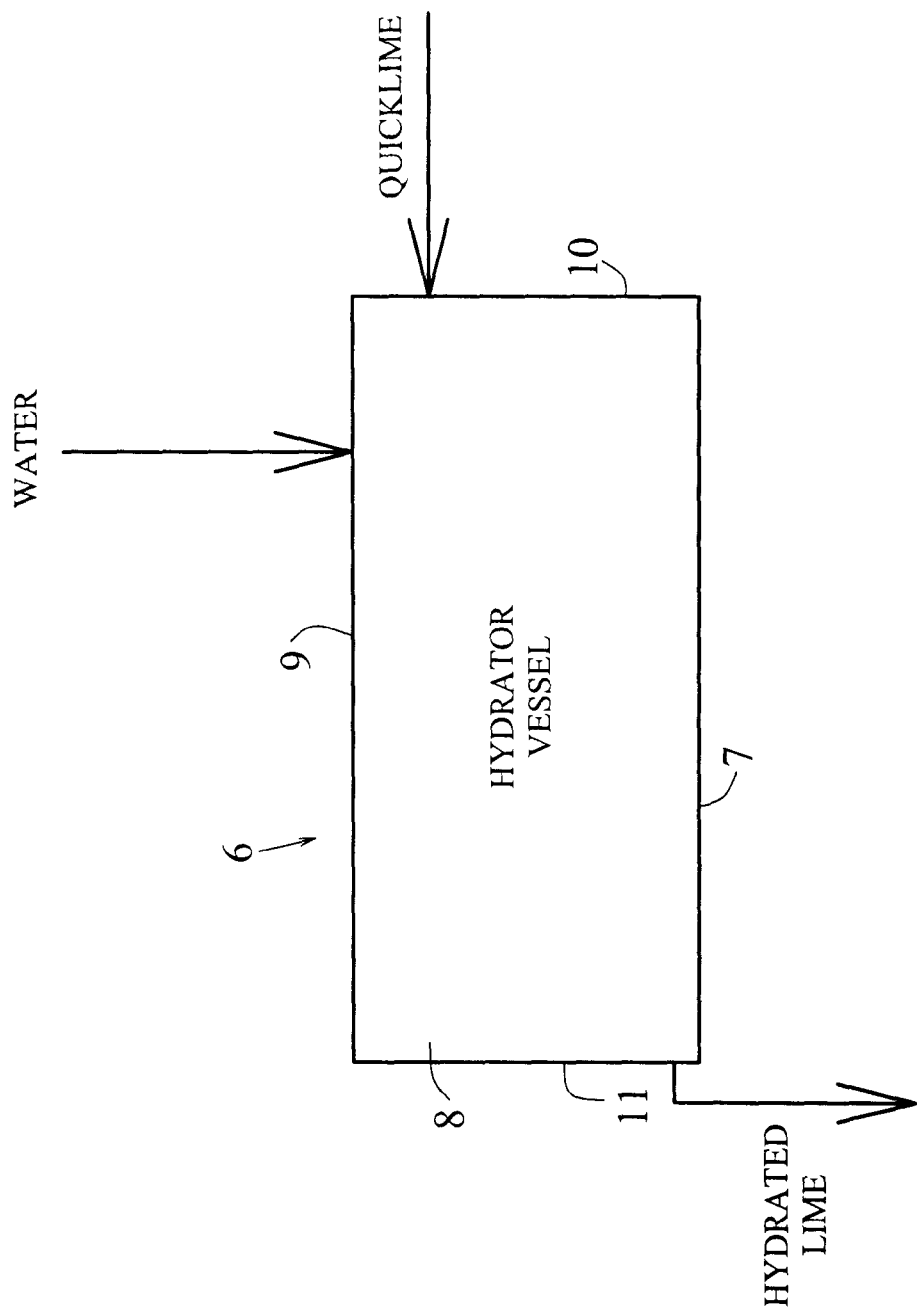
FIG. 1 schematically illustrates the hydration of quicklime to produce hydrated lime.

An apparatus and method are provided for forming hydrated lime that has preferred properties, for use in removing sulfur dioxide from gaseous streams, such as a consistently high specific surface area In FIG. 1, a schematic description of hydration of quicklime is illustrated, where a hydration vessel (6), having a bottom wall (7), side walls (8, 8') and top wall (9) is provided, and water and quicklime added at one end (10) of the vessel. The water and quicklime are mixed in the vessel (6) and moved by screw-like members to the other end (11) of the vessel (8), where hydrated lime, formed by the exothermic reaction of quicklime and water is discharged from the vessel.

In FIG. 2, a conventional screw-like member (1) for mixing and moving water and quicklime in a hydrator vessel is illustrated, where spaced adjacent shafts (2, 2') having spiral blades (3, 3') (similar to Archimedes screws) provided on the shafts (2 and 2'), respectively. Rotation of the shafts with the spiral blades mix together the water and quicklime added to the vessel and move the reacting mixture through the vessel. Shaft (2) rotates in one direction (right hand rotation), while shaft (2') rotates in the opposite direction (left hand rotation) with the reacting mixture fed between the shafts (2, 2') in an upward direction.

In FIG. 3, another conventional mixing and moving member is illustrated having spaced, adjacent shafts (4, 4') that are provided with a series of spaced paddles (5, 5') on the shafts (4, 4'), the paddles slightly angled so as to move a mixture of quicklime and water through a vessel while blending the same. As illustrated by the arrows in FIG. 3, the shafts rotate in opposite directions with the reactive mixture fed between the shafts (4, 4') in an upward direction.

While such conventional hydrating systems are effective, they do not provide uniform product quality and a hydrated lime that has a consistently high specific surface area (SSA) and pre volume.

Figure 4:
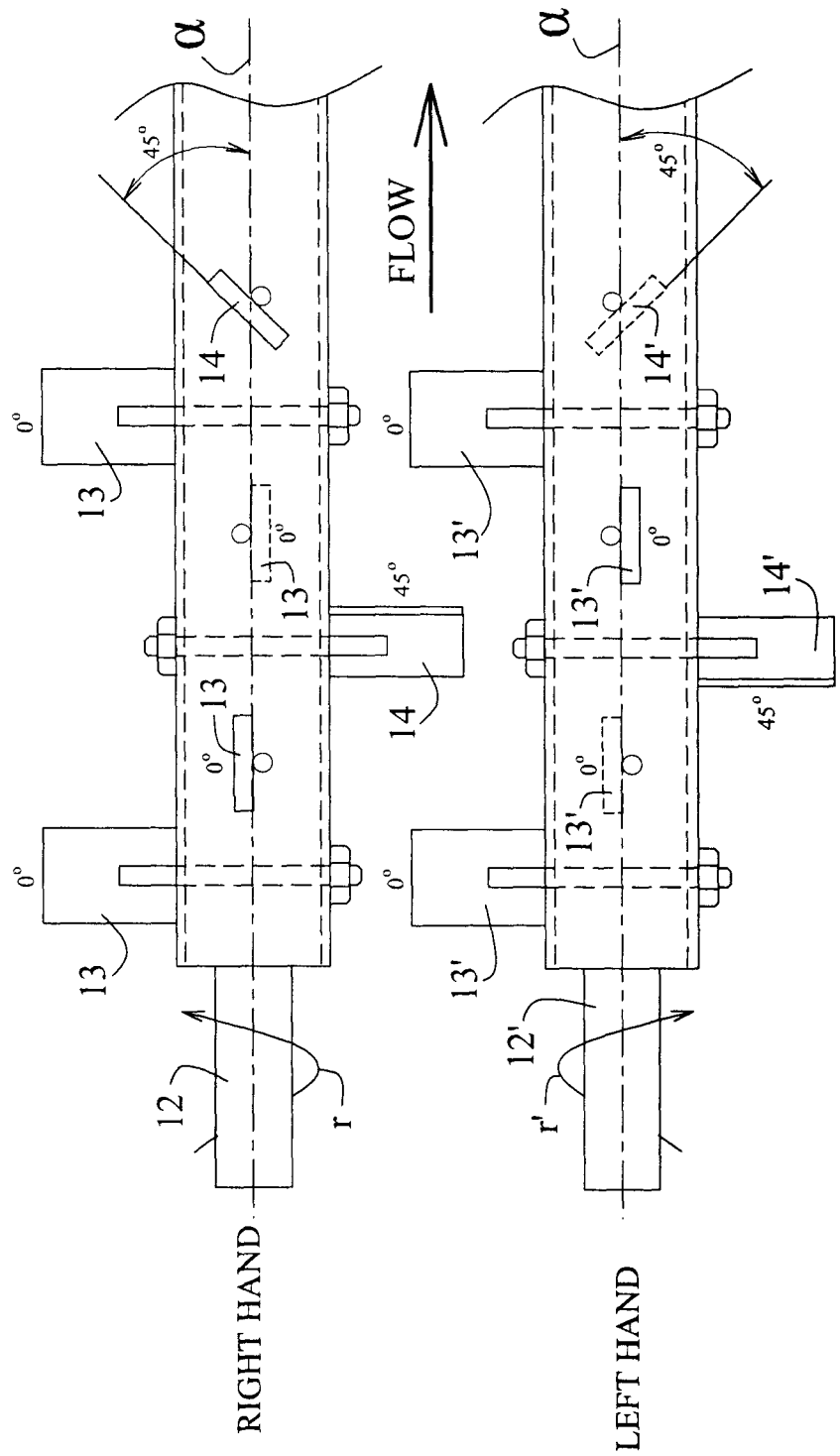
FIG. 4 illustrates an apparatus according to the present invention, where adjacent, rotating, parallel shafts are provided having a plurality of first sets of blades that are coaxial with a longitudinal axis of the shaft and a plurality of second sets of blades that are angularly displaced relative to the axis for mixing quicklime and water in a vessel to form hydrated lime.
Figure 5:
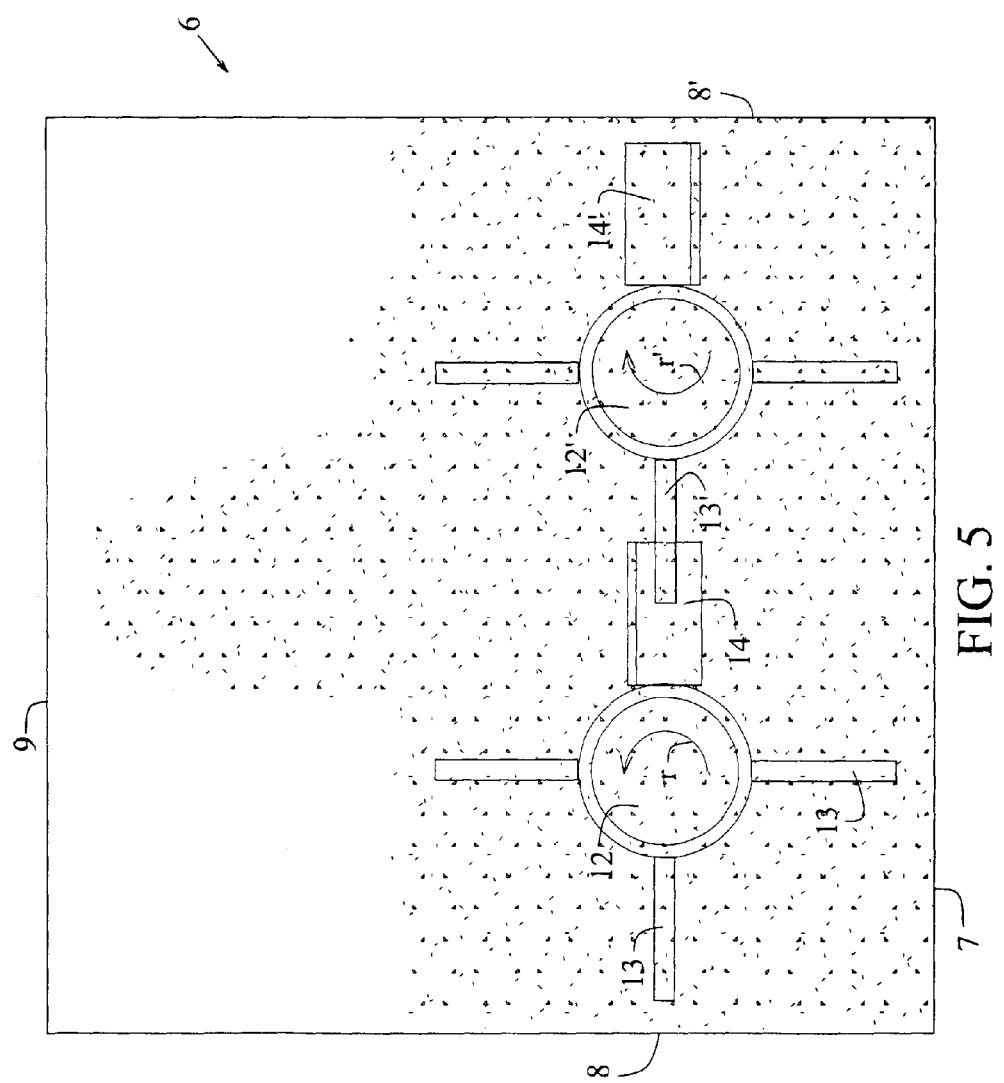
FIG. 5 is a cross-sectional view through an apparatus of the present invention.

An embodiment of the present lime hydrating apparatus is illustrated in FIGS. 4 and 5, in conjunction with FIG. 1. In the present apparatus, an elongated horizontally disposed, enclosed mixing vessel has a cover, an inlet at one end for feeding quicklime and water thereto to form hydrated lime, and a discharge at another end for removal of hydrated lime from the vessel, and an improved system for moving and mixing the quicklime and water.

In the horizontal mixing vessel (6), having a bottom wall (7), side walls (8, 8') and cover (9), inlet end (10) and an outlet end (11), there are a pair of spaced, adjacent, parallel rotatable shafts (12, 12'), which are disposed within the horizontal mixing vessel (6) along a longitudinal axis a of the horizontal mixing vessel (6). The shafts (12, 12') are rotatable in opposite directions, as illustrated by the arrows (r and r').

Each shaft (12, 12') has a plurality of specifically arranged outwardly extending blades, a first set of spaced blades (13) extending outwardly from the shaft (12) which extend coaxially with the longitudinal axis of the shaft (12), and a further first set of spaced blades (13') extending outwardly from the shaft (12'), along and coaxial with the axis of the shaft (12"). As illustrated in FIG. 4, adjacent coaxial blades (13) on shaft (12) and adjacent coaxial blades (13') on shaft (12') are preferably circumferentially offset from each other along the shafts (12 and 12'), respectively. The adjacent axially extending blades (13) on shaft (12) and the axially extending blades (13') on shaft (12') are circumferentially offset from each other along the shaft, preferably by 180 degrees, as illustrated in FIG. 4.

Also disposed on each of the rotatable shafts (12 and 12') is a second set of adjacent spaced blades, which spaced blades (14) extending outwardly at an angle to the longitudinal axis a of the shaft (12), and a further second set of spaced blades (14') extending outwardly at an angle to the longitudinal axis of the shaft (12'). The adjacent angular blades (14) on shaft (12) are circumferentially offset from each other by about 90 degrees, and the adjacent angular blades (14') on shaft (12') are also circumferentially offset from each other, preferably by about 90 degrees.

Also, the angular blades (14) on shaft (12) are inclined in an opposite direction as are the blades (14') on shaft (12'), as illustrated in FIGS. 4 and 5. In addition, two axial extending blades (13) on shaft (12) and two axially extending blades (13') on shaft (12') may be provided, offset from each other by 90 degrees between adjacent angular blades (14 and 14'), respectively.

The use of the above-identified moving and mixing system provides better mixing of the water and quicklime. The arrangement provides better shear between the water and quicklime and more uniform mixing thereof. Since the reaction of quicklime and water is exothermic, more uniform mixing prevents formation of isolated hot spots and overheating which forms a lesser quality hydrated lime. The present design, as compared to conventional designs, mechanically slows forward movement of material through the hydrator by at times tossing the reaction mixture vertically into a space between the rotating shafts and the hydrator cover (9) of the hydrator, as shown in FIG. 5. This allows heat generated from the exothermic reaction to be better dissipated, such that the reaction temperature is reduced and, in effect, there is increased heat transfer from the reaction zone which results in an improved and ore consistent specific surface area and pore volume of the hydrated lime product. While the improvements are not as pronounced with all limes tested, they are found with lime as shown in the following graph.

The present method, using the described hydrating apparatus is carried out in a manner that produces a hydrated lime especially useful in removing sulfur dioxide from flue gases.

The method provides an elongated, horizontally disposed, enclosed mixing vessel with a cover, an inlet at one end for feeding quicklime and water thereto to form mixture, and a discharge at another end for removal of hydrated lime formed therein. A pair of spaced, adjacent, parallel rotatable shafts are disposed within the mixing vessel along a longitudinal axis of the mixing vessel, the shafts rotatable in opposite directions, with each shaft having a plurality of outwardly extending sets of blades, with a first set of spaced blades extending coaxially with the longitudinal axis of each shaft with a first set of spaced blades extending coaxially with the longitudinal axis of each shaft and an adjacent second set of blades extending at an angle to the longitudinal axis of each shaft. A mixture of quicklime and water is charged at the one end of the vessel to form mixture, and the shafts rotated so as to direct the mixture upwardly into a space between the shafts and towards the cover, while forming hydrated lime, and moving the hydrated lime formed through the mixing vessel, with the hydrated lime formed removed from the another end of the vessel.

The improved design enables a reduction in process temperature with improved mixing and heat transfer.

The mixture in the vessel is directed upwardly between the spaced shafts and into the space between the shafts and the vessel cover and is moved by the sets of blades towards the discharge end of the vessel for removal. The mixture is directed upwardly into the space between the shafts and the vessel cover in a period of time sufficient to form a hydrated lime having a BET specific surface area of greater than 18 $m^2/g$ and more preferably greater than 19 $m^2/g$, as well as a total pore volume of about 0.08 $cm^3/g$.

Figure 6:
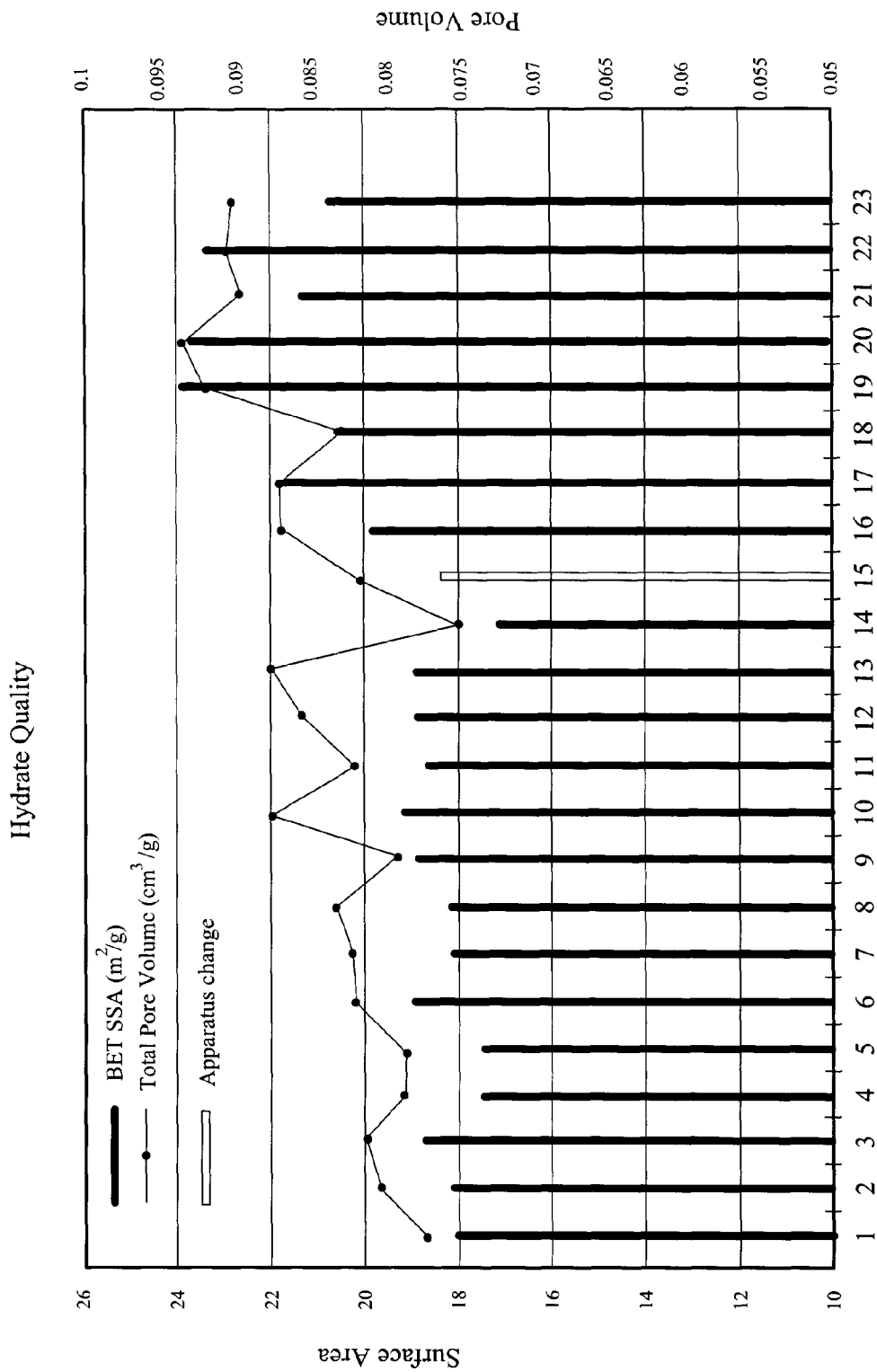
FIG. 6 is a graphical description of the improved special surface area (SSA) and Pore Volume properties of product produced according to the present invention as compared to a prior art hydrator.

In FIG. 6, there is graphically illustrated the improved BET specific surface areas and pore volume of hydrated lime produced using the present hydrator as compared with a conventional hydrating system. The BET specific surface area and total pore volume of hydrate form using a conventional hydrator is shown in runs (1-14), whereas the improved apparatus was used in runs (16-23). The graph illustrates that the present claimed apparatus provided BET specific surface areas of greater than 18 $mg^2/g$ (about 19 $mg^2/g$) as compared with the conventional production of less than about 19 $mg^2/g$, while the pore volume of the hydrated lime produced also showed an increased pore volume.

General test results have shown that with the conventional hydrator, using feed rates of between 5.5-7.1 tons/hr of quicklime and 14.4-16.6 gal./min. of water, the exit temperature of the quicklime produced, from the hydrator, was between 192-343° F., and the quicklime produced had a BET specific surface area of between 18.14-20.24 $m^2/g$ and total pore volume of 0.0714-0.0876 $cm^3/g$. In contrast, using the hydrator of the present invention, with feed rates of 6.3-8.2 tons/hr. of quicklime and 16.6-19.1 gal/min. of water, the exit temperature of the quicklime produced, from the hydrator was lower, between 143-162° F., showing significant temperature disposition therein, and the quicklime produced had a BET specific surface area of between 19.88-24.20 $m^2/g$ and total pore volume of 0.830-0.1011 $cm^3/g$.

While the present invention has been described with reference to the preferred embodiment, those skilled in the art may make changes in form and detail without departing from the spirit and scope of the invention as defined in the following claims.

What is claimed is:

1. In a lime hydrating apparatus having:

an elongated, horizontally disposed, enclosed mixing vessel having a cover, an inlet at one end for feeding quicklime and water thereto to form mixture, and a discharge at another end for removal of hydrated lime formed therein; the improvement comprising:

a pair of spaced, adjacent, parallel rotatable shafts disposed within the mixing vessel along a longitudinal axis of the mixing vessel, the shafts rotatable in opposite directions, wherein each shaft has a plurality of outwardly extending sets of blades thereon, with a first set of spaced blades extending coaxially with the longitudinal axis of each shaft, with adjacent blades of the first set of blades circumferentially offset from each other by about 90 degrees, and an adjacent second set of blades extending at an angle to the longitudinal axis of each shaft, with adjacent blades of the second set of blades inclined in an opposite direction relative to an adjacent blade, the blades arranged so as to toss the mixture upwardly into a space between the shafts and towards the cover, while forming hydrated lime that is moved toward and removed from the discharge.

2. The lime hydrating apparatus as defined in claim 1, wherein the second sets of blades are inclined at an angle of about 45 degrees relative to the respective longitudinal axis.

3. The lime hydrating apparatus as defined in claim 1, wherein first and second adjacent shafts are provided and wherein a plurality of second set of blades on the first shaft are inclined in an opposite direction of a second set of blades on the second shaft.

4. The lime hydrating apparatus as defined in claim 1, wherein two first sets of spaced blades extending coaxially with the longitudinal axis of each shaft are provided between the second sets of blades extending at an angle to the longitudinal axis.

5. The lime hydrating apparatus as defined in claim 4, wherein adjacent blades of the first set of blades are circumferentially offset from each other by about 90 degrees.

6. The lime hydrating apparatus as defined in claim 1, wherein second sets of blades on adjacent shafts are inclined in opposite directions.

7. In a lime hydrating apparatus having:
an elongated, horizontally disposed, enclosed mixing vessel having a cover, an inlet at one end for feeding quicklime and water thereto to form mixture, and a discharge at another end for removal of hydrated lime formed therein, the improvement comprising:
a pair of spaced, adjacent, parallel rotatable shafts disposed within the mixing vessel along a longitudinal axis of the mixing vessel, the shafts rotatable in opposite directions, wherein
each shaft has a plurality of outwardly extending sets of blades thereon, with a first set of spaced blades extending coaxially with the longitudinal axis of each shaft, with adjacent blades of the first set being circumferentially offset from each other by about 90 degrees, and an adjacent second set of blades extending at an angle to the longitudinal axis of each shaft, with the blades of the second set inclined at an angle of 45 degrees relative to the respective longitudinal axis, the blades arranged so as to toss the mixture upwardly into a space between the shafts and towards the cover, while forming hydrated lime that is moved toward and removed from the discharge.

8. The lime hydrating apparatus as defined in claim 7, wherein first and second adjacent shafts are provided and wherein a plurality of second set of blades on the first shaft are inclined in an opposite direction of a second set of blades on the second shaft.

9. The lime hydrating apparatus as defined in claim 8, wherein two first sets of spaced blades extending coaxially with the longitudinal axis of each shaft are provided between the second sets of blades extending at an angle to the longitudinal axis.

* * * * *